B. C. OPFER.
FOOD GRINDER ATTACHMENT.
APPLICATION FILED JULY 31, 1918.
1,281,198.
Patented Oct. 8, 1918.
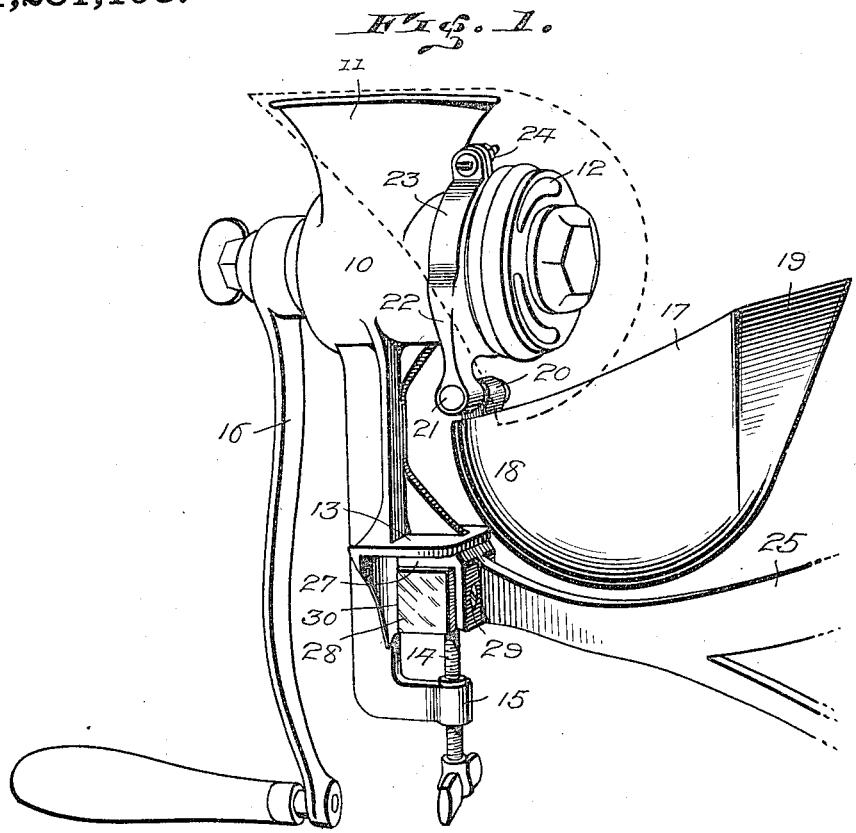
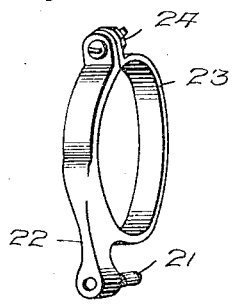
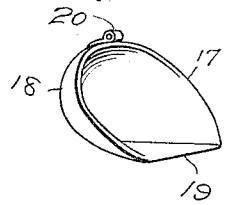
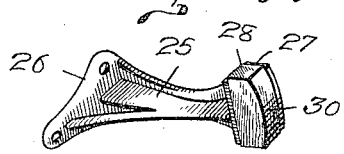
Inventor
Benjamin C. Opfer
W. J. Fitz Gerald & Co.
Attorneys

UNITED STATES PATENT OFFICE.

BENJAMIN C. OPFER, OF WAUKON, IOWA.

FOOD-GRINDER ATTACHMENT.

1,281,198. Specification of Letters Patent. Patented Oct. 8, 1918.

Application filed July 31, 1918. Serial No. 247,602.

*To all whom it may concern:*

Be it known that I, BENJAMIN C. OPFER, a citizen of the United States, residing at Waukon, in the county of Allamakee and State of Iowa, have invented certain new and useful Improvements in Food-Grinder Attachments; and I do hereby declare the following to be a full, clear, and exact description of the invention, such as will enable others skilled in the art to which it appertains to make and use the same.

This invention relates to a food grinder attachment, and particularly to a receptacle adapted to coöperate therewith.

The invention has for an object to provide a novel and improved construction of attachment embodying a receptacle pivotally mounted to receive material from the delivery of the food grinder and also to swing into position to close the feed hopper of the grinder when not in use.

A further object of the invention is to provide a novel and improved construction of attachment for application to a food grinder and a novel form of receptacle having a curved body and flattened end portion to coöperate with the feed and delivery portions of the grinder.

Another object of the invention is to provide an improved form of bracket by which the grinder may be mounted and adjusted to any desired position convenient for the user.

Other and further objects and advantages of the invention will be hereinafter set forth and the novel features thereof defined by the appended claims.

In the drawing,

Figure 1 is a perspective showing the invention in use.

Fig. 2, a detail perspective of the pivoting ring.

Fig. 3, a similar view of the receptacle, and

Fig. 4, a like detail of the supporting bracket looking from the under side thereof.

Like numerals of reference refer to like parts in the several figures of the drawing.

The numeral 10 designates the body of a food grinder which may be of any desired construction or configuration in ordinary use. This body is provided with a feed or hopper portion 11 open at the top and with a delivery portion 12 of usual construction. The body of the hopper is adapted to be supported by the foot 13 adapted to rest upon a support and coöperating with the clamp screw 14 threaded through an arm 15 of the grinder. The parts of the grinder are operated in the usual manner by means of the handle 16.

The receiving receptacle 17 may be of any preferred size or configuration, but a desirable form thereof is herein shown wherein the body 18 thereof is curved or bowl-shaped and merges into a flat end wall 19 which is adapted to facilitate the emptying of the receptacle when material is to be removed therefrom and also to form a tight closure over the open end of the hopper portion 11 when the receptacle is swung upward into that position, as indicated by dotted lines in Fig. 1. This receptacle may be pivotally mounted upon the body of the grinder in any preferred manner, for instance, by means of a lug or eye 20 thereon adapted to receive the pivot pin 21 carried by a depending lug 22 from the split clamp 23. This clamp is adapted to be opened sufficient for application to the circular body of the grinder and then firmly secured in position by any desired means, such as the nut and bolt 24 shown in Fig. 1. It will be seen that this means permits the application of the attachment to any of the ordinary and usual forms of food grinders on the market.

Fig. 4 illustrates a very desirable form of supporting bracket 25 for the grinder which is provided at its inner end with an attaching plate 26 adapted to be secured to any fixed support and at its outer end with an angular clamping plate 27 within which a block of wood or other slightly yielding material 28 is secured so as to secure a firm contact with the clamping screw 14. This block may be attached to the angle plate in any desired manner, for instance, by means of a screw 29 passing therethrough and the outer face of the block and also of the horizontal portion of the plate 27 is curved upon the arc of a circle, as shown at 30. By this means the grinder may be adjusted at different angles radiating from the center of the bracket and thus located in the most convenient position for use and may be there securely clamped.

In the operation of the invention, it will be seen that when the receptacle is in the position shown by full lines in Fig. 1, it is disposed to receive the material delivered from the grinder and to prevent waste or dropping thereof and the form of this receptacle permits it to be easily emptied and cleaned.

The pivotal mounting of the receptacle in connection with its flat end portion causes the same to form a complete closure for the hopper or feed portion of the grinder when not in use and also to inclose the delivery end so as to protect these parts from flies, insects or dirt, and after the hopper has been cleansed, this construction protects the same in such condition so that it is constantly ready for use by simply swinging the receptacle into receiving position. The construction also permits the receptacle to be removed from the grinder for any purpose desired and the form of attaching means here shown permits the application of the device to any ordinary construction of food grinder. The construction of bracket presented also facilitates the adjustment of the grinder into the most convenient position for use.

The invention presents a simple, efficient and very economically constructed attachment, and while the specific construction of the several parts has been described, the invention is not confined thereto as the novel features are set forth in the following claims.

Having thus described my invention, what I claim as new is:—

1. In a food grinder attachment, a receptacle pivotally mounted thereon to receive material from the delivery thereof and disposed to swing over and close the feed portion of the grinder.

2. In a food grinder, a pivoting member attached to the body thereof adjacent the delivery portion, a receptacle mounted upon said pivoting member beneath said delivery portion and provided with an end wall adapted to close the feed portion of the grinder when the receptacle is swung over said delivery portion.

3. In a food grinder, a pivoting member mounted upon the grinder adjacent the delivery thereof, a receptacle having a curved bowl portion and a straight end wall, and a pivoting eye carried by said bowl portion to coöperate with said pivoting member.

4. In a food grinder attachment, a split clamping ring adapted to embrace the body thereof adjacent the delivery portion, a depending lug from said ring, a lateral pivot from said lug, a receptacle having a curved body and flat end wall, and a pivoting eye upon the body of said receptacle adapted to be disposed upon said pivot.

5. In a food grinder attachment, a receptacle mounted thereon to receive material from the delivery thereof and disposed to be moved to close the feed portion of the grinder while mounted upon the same.

In testimony whereof I have signed my name to this specification in the presence of two subscribing witnesses.

BENJAMIN C. OPFER.

Witnesses:
 OTTO F. NEY,
 ALBERT T. TWEET.

Copies of this patent may be obtained for five cents each, by addressing the "Commissioner of Patents, Washington, D. C."